United States Patent
Deng et al.

(10) Patent No.: US 10,903,925 B2
(45) Date of Patent: Jan. 26, 2021

(54) INTERFERENCE COORDINATION METHOD, APPARATUS, AND SYSTEM

(71) Applicant: Huawei Technologies Co., Ltd., Shenzhen (CN)

(72) Inventors: Tianle Deng, Shenzhen (CN); Haiyan Luo, Shanghai (CN); Xiao Chen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/197,177

(22) Filed: Nov. 20, 2018

(65) Prior Publication Data

US 2019/0089473 A1 Mar. 21, 2019

Related U.S. Application Data

(63) Continuation of application No. 15/198,149, filed on Jun. 30, 2016, now Pat. No. 10,142,045, which is a (Continued)

(51) Int. Cl.
  *H04J 11/00* (2006.01)
  *H04L 25/03* (2006.01)
  (Continued)

(52) U.S. Cl.
  CPC ......... *H04J 11/0056* (2013.01); *H04H 20/30* (2013.01); *H04L 5/005* (2013.01); (Continued)

(58) Field of Classification Search
  None
  See application file for complete search history.

(56) References Cited

U.S. PATENT DOCUMENTS 9,173,228 B2 * 10/2015 Linsky ............... H04W 72/1215
9,226,312 B2 * 12/2015 Ji ....................... H04W 72/1263
(Continued)

FOREIGN PATENT DOCUMENTS

| CN | 101252786 A | 8/2008 |
| CN | 102227148 A | 10/2011 |

(Continued)

OTHER PUBLICATIONS

Nsn et al., "On Remaining Issues of Necessary Backhaul Signalling," 3GPP TSG-RAN WG1 Meeting #74bis, R1-134507, Guangzhou, China, Oct. 7-11, 2013, pp. 1-3.
(Continued)

*Primary Examiner* — Hong S Cho
(74) *Attorney, Agent, or Firm* — Slater Matsil, LLP

(57) ABSTRACT

A method includes: acquiring, by a second base station, time-frequency position information corresponding to cell key information of a first base station, where the time-frequency position information is used for determining a time-frequency position that is corresponding to the cell key information of the first base station and that is on a shared time-frequency resource, and the cell key information includes at least one of a cell-specific reference signal (CRS), a channel state indication-reference signal (CSI-RS), a physical broadcast channel (PBCH), and a synchronization signal. The method also includes performing, by the second base station, interference coordination on the first base station.

20 Claims, 4 Drawing Sheets

A second base station acquires time-frequency position information corresponding to cell key information of a first base station — 10

The second base station performs, at a time-frequency position, interference coordination on the first base station — 20

Related U.S. Application Data continuation of application No. PCT/CN2013/090873, filed on Dec. 30, 2013.

(51) Int. Cl.

| | | |
|---|---|---|
| *H04W 72/04* | (2009.01) | |
| *H04W 72/08* | (2009.01) | |
| *H04L 5/00* | (2006.01) | |
| *H04H 20/30* | (2008.01) | |
| *H04W 72/12* | (2009.01) | |
| *H04W 88/12* | (2009.01) | |

(52) U.S. Cl.
CPC .......... *H04L 5/0035* (2013.01); *H04L 5/0073* (2013.01); *H04L 25/03012* (2013.01); *H04L 25/03159* (2013.01); *H04W 72/0453* (2013.01); *H04W 72/0473* (2013.01); *H04W 72/08* (2013.01); *H04W 72/082* (2013.01); *H04W 72/1226* (2013.01); *H04W 88/12* (2013.01)

(56) References Cited

U.S. PATENT DOCUMENTS

| | | | | |
|---|---|---|---|---|
| 9,426,811 | B2* | 8/2016 | Kim | ................ H04W 72/082 |
| 2010/0040184 | A1 | 2/2010 | Haralabidis et al. | |
| 2011/0009149 | A1 | 1/2011 | Chen et al. | |
| 2011/0103241 | A1* | 5/2011 | Cho | ................... H04L 5/0073 |
| | | | | 370/252 |
| 2012/0236766 | A1 | 9/2012 | Haralabidis et al. | |
| 2012/0258724 | A1* | 10/2012 | Kim | ................ H04W 72/082 |
| | | | | 455/452.2 |
| 2013/0301420 | A1 | 11/2013 | Zhang et al. | |
| 2013/0315183 | A1 | 11/2013 | Xiang et al. | |
| 2014/0029463 | A1* | 1/2014 | Su | ................... H04W 24/10 |
| | | | | 370/252 |
| 2015/0043369 | A1* | 2/2015 | Kim | ................... H04W 24/08 |
| | | | | 370/252 |
| 2015/0146644 | A1* | 5/2015 | Kim | .................... H04L 5/0035 |
| | | | | 370/329 |
| 2015/0156693 | A1* | 6/2015 | Tabet | ................ H04W 76/14 |
| | | | | 455/437 |
| 2016/0135213 | A1* | 5/2016 | Zhu | .................... H04W 24/02 |
| | | | | 370/329 |

FOREIGN PATENT DOCUMENTS

| | | |
|---|---|---|
| CN | 102291840 A | 12/2011 |
| CN | 102340782 A | 2/2012 |
| CN | 102595436 A | 7/2012 |
| CN | 102723913 A | 10/2012 |
| CN | 102792601 A | 11/2012 |
| CN | 102917448 A | 2/2013 |
| EP | 2665305 A1 | 11/2013 |
| EP | 2741547 A1 | 6/2014 |
| WO | 2010135466 A1 | 11/2010 |
| WO | 2011085192 A1 | 7/2011 |
| WO | 2012093289 A1 | 7/2012 |

OTHER PUBLICATIONS

Broadcom Corporation, "Discussion on Coordination and Signaling in NAICS," 3GPP TSG RAN WG1 Meeting#74bis, R1-134592, Guanghou, China, Oct. 7-11, 2013, pp. 1-4.

* cited by examiner

INTERFERENCE COORDINATION METHOD, APPARATUS, AND SYSTEM

CROSS-REFERENCE TO RELATED APPLICATIONS

This application is a continuation of U.S. application Ser. No. 15/198,149, filed on Jun. 30, 2016, now U.S. Pat. No. 10,142,045, which is a continuation of International Application No. PCT/CN2013/090873, filed on Dec. 30, 2013. All of the afore-mentioned patent applications are hereby incorporated by reference in their entireties.

TECHNICAL FIELD

The present disclosure relates to the communications field, and in particular, to an interference coordination method, an apparatus, and a system.

BACKGROUND

To efficiently use a frequency spectrum resource, a frequency spectrum resource is generally shared in inter-RAT networks, for example, an LTE (Long Term Evolution) network and a GSM (Global System for Mobile Communications) network. The GSM network mainly uses frequency bands of 900 MHz and 1800 MHz. With rapid development of service data, a portion of the frequency bands used by the GSM network is gradually shared with the LTE network for use, thereby improving utilization efficiency of the frequency spectrum resource and reducing network construction costs.

Because networks that share a frequency spectrum may use a shared time-frequency resource, a co-channel interference problem exists. In this scenario, an interference coordination technology is generally used to avoid co-channel interference. However, to reduce system overhead, interference coordination cannot be performed on all physical resources in a frequency spectrum shared among networks to resolve a co-channel interference problem. That is, due to reasons such as system overhead, an existing interference coordination method cannot well resolve a problem of interference between networks.

SUMMARY

Embodiments provide an interference coordination method, an apparatus, and a system, which can ensure that a problem of interference between networks is better resolved in a case of relatively low system overhead among inter-RAT networks that share a frequency spectrum.

According to a first aspect, a base station is provided. The base station is a second base station in a wireless communications system that includes a first base station and the second base station. The first base station and the second base station use different radio access technologies. The first base station and the second base station share a time-frequency resource. The base station includes an acquiring unit, configured to acquire time-frequency position information corresponding to cell key information of the first base station, where the time-frequency position information is used for determining a time-frequency position that is corresponding to the cell key information of the first base station and that is on the shared time-frequency resource, and the cell key information includes at least one piece of the following information: a cell-specific reference signal CRS, a channel state indication-reference signal (CSI-RS), a physical broadcast channel (PBCH), and a synchronization signal. The base station also includes an adjusting unit, configured to perform, at the time-frequency position determined according to the time-frequency position information acquired by the acquiring unit, interference coordination on the first base station.

Based on the first aspect, in a first possible implementation manner of the first aspect, the acquiring unit is specifically configured to: receive the time-frequency position information sent by the first base station; or receive the time-frequency position information sent by a multi-RAT controller. The time-frequency position information includes the following information: time domain position information corresponding to the cell key information of the first base station; or frequency domain position information corresponding to the cell key information of the first base station.

Based on the first possible implementation manner of the first aspect, in a second possible implementation manner of the first aspect, the time domain position information includes a time domain position corresponding to the cell key information of the first base station, or time information used for determining a time domain position. The time information includes absolute time corresponding to the cell key information of the first base station or frame information corresponding to the cell key information of the first base station, and the frame information includes a frame number, a subframe number, or an offset value of a constant subframe of a radio frame corresponding to the cell key information of the first base station.

Based on the first possible implementation manner or the second possible implementation manner of the first aspect, in a third possible implementation manner of the first aspect, the frequency domain position information includes a frequency domain position corresponding to the cell key information of the first base station, or frequency domain information used for determining a frequency domain position. The frequency domain information includes a combination of an absolute frequency channel number corresponding to the cell key information, a center frequency of the first base station, and a preset frequency domain offset value, or a combination of a center frequency, bandwidth, and a physical resource block number.

Based on any one of the first possible implementation manner of the first aspect to the third possible implementation manner of the first aspect, in a fourth possible implementation manner of the first aspect, the time-frequency position information is the time domain position information, and the time-frequency position is all frequency domains or a preset frequency domain of the shared time-frequency resource, and the time domain position determined by the time domain position information; or the time-frequency position information is the frequency domain position information, and the time-frequency position is all time domains or a preset time domain of the shared time-frequency resource, and the frequency domain position determined by the frequency domain position information; or the time-frequency position information is the time domain position information and the frequency domain position information, and the time-frequency position is the time domain position determined by the time domain position information and the frequency domain position determined by the frequency domain position information.

Based on any one of the first aspect to the fourth possible implementation manner of the first aspect, in a fifth possible implementation manner of the first aspect, on the shared frequency spectrum, transmit power of the second base station is higher than transmit power of the first base station.

Based on any one of the first aspect to the fifth possible implementation manner of the first aspect, in a sixth possible implementation manner of the first aspect, the adjusting unit is specifically configured to: at the time-frequency position determined by the time-frequency position information acquired by the acquiring unit, reduce data transmission power or use a noise reduction algorithm; or the adjusting unit is specifically configured to avoid performing resource scheduling at the time-frequency position determined by the time-frequency position information acquired by the acquiring unit.

According to a second aspect, a multi-RAT controller is provided. The multi-RAT controller is applied to a wireless communications system that includes a first base station, a second base station, and the multi-RAT controller. The first base station and the second base station use different radio access technologies. The first base station and the second base station share a time-frequency resource. The multi-RAT controller performs resource scheduling and management on the first base station and the second base station. The multi-RAT controller includes: an acquiring unit, configured to acquire time-frequency position information corresponding to cell key information of the first base station, where the time-frequency position information is used for determining a time-frequency position that is corresponding to the cell key information of the first base station and that is on the shared time-frequency resource, and the cell key information includes at least one piece of the following information: a cell-specific reference signal (CRS), a channel state indication-reference signal (CSI-RS), a physical broadcast channel (PBCH), and a synchronization signal. The multi-RAT controller also includes a sending unit, configured to send the time-frequency position information acquired by the acquiring unit to the second base station. The time-frequency position information is used by the second base station to perform, at the time-frequency position, interference coordination on the first base station.

Based on the second aspect, in a first possible implementation manner of the second aspect, the acquiring unit is specifically configured to receive, by the multi-RAT controller, the time-frequency position information sent by the first base station. The time-frequency position information includes the following information: time domain position information corresponding to the cell key information of the first base station; or frequency domain position information corresponding to the cell key information of the first base station.

Based on the first possible implementation manner of the second aspect, in a second possible implementation manner of the second aspect, the time domain position information includes a time domain position corresponding to the cell key information of the first base station, or time information used for determining a time domain position. The time information includes absolute time corresponding to the cell key information of the first base station or frame information corresponding to the cell key information of the first base station, and the frame information includes a frame number, a subframe number, or an offset value of a constant subframe of a radio frame corresponding to the cell key information of the first base station.

Based on the first possible implementation manner or the second possible implementation manner of the second aspect, in a third possible implementation manner of the second aspect, the frequency domain position information includes a frequency domain position corresponding to the cell key information of the first base station, or frequency domain information used for determining a frequency domain position. The frequency domain information includes a combination of an absolute frequency channel number corresponding to the cell key information, a center frequency of the first base station, and a preset frequency domain offset value, or a combination of a center frequency, bandwidth, and a physical resource block number.

Based on any one of the first possible implementation manner of the second aspect to the third possible implementation manner of the second aspect, in a fourth possible implementation manner of the second aspect, the time-frequency position information is the time domain position information, and the time-frequency position is all frequency domains or a preset frequency domain of the shared time-frequency resource, and the time domain position determined by the time domain position information; or the time-frequency position information is the frequency domain position information, and the time-frequency position is all time domains or a preset time domain of the shared time-frequency resource, and the frequency domain position determined by the frequency domain position information; or the time-frequency position information is the time domain position information and the frequency domain position information, and the time-frequency position is the time domain position determined by the time domain position information and the frequency domain position determined by the frequency domain position information.

Based on any one of the second aspect to the forth possible implementation method of the second aspect, in a fifth possible implementation manner of the second aspect, on the shared time-frequency resource, transmit power of the second base station is higher than transmit power of the first base station.

According to a third aspect, an interference coordination method is provided, where the method is applied to a wireless communications system that includes a first base station and a second base station. The first base station and the second base station use different radio access technologies. The first base station and the second base station share a time-frequency resource. The method includes acquiring, by the second base station, time-frequency position information corresponding to cell key information of the first base station, where the time-frequency position information is used for determining a time-frequency position that is corresponding to the cell key information of the first base station and that is on the shared time-frequency resource, and the cell key information includes at least one piece of the following information: a cell-specific reference signal (CRS), a channel state indication-reference signal (CSI-RS), a physical broadcast channel (PBCH), and a synchronization signal. The method also includes performing, by the second base station at the time-frequency position, interference coordination on the first base station.

Based on the third aspect, in a first possible implementation manner of the third aspect, the acquiring, by the second base station, time-frequency position information includes: receiving, by the second base station, the time-frequency position information sent by the first base station; or receiving, by the second base station, the time-frequency position information sent by a multi-RAT controller. The time-frequency position information includes the following information: time domain position information corresponding to the cell key information of the first base station; or frequency domain position information corresponding to the cell key information of the first base station.

Based on the first possible implementation manner of the third aspect, in a second possible implementation manner of the third aspect, the time domain position information includes a time domain position corresponding to the cell key information of the first base station, or time information used for determining a time domain position. The time information includes absolute time corresponding to the cell key information of the first base station or frame information corresponding to the cell key information of the first base station, and the frame information includes a frame number, a subframe number, or an offset value of a constant subframe of a radio frame corresponding to the cell key information of the first base station.

Based on the first possible implementation manner or the second possible implementation manner of the third aspect, in a third possible implementation manner of the third aspect, the frequency domain position information includes a frequency domain position corresponding to the cell key information of the first base station, or frequency domain information used for determining a frequency domain position. The frequency domain information includes a combination of an absolute frequency channel number corresponding to the cell key information, a center frequency of the first base station, and a preset frequency domain offset value, or a combination of a center frequency, bandwidth, and a physical resource block number.

Based on any one of the first possible implementation manner of the third aspect to the third possible implementation manner of the third aspect, in a fourth possible implementation manner of the third aspect, the time-frequency position information is the time domain position information, and the time-frequency position is all frequency domains or a preset frequency domain of the shared time-frequency resource, and the time domain position determined by the time domain position information; or the time-frequency position information is the frequency domain position information, and the time-frequency position is all time domains or a preset time domain of the shared time-frequency resource, and the frequency domain position determined by the frequency domain position information; or the time-frequency position information is the time domain position information and the frequency domain position information, and the time-frequency position is the time domain position determined by the time domain position information and the frequency domain position determined by the frequency domain position information.

Based on any one of the third aspect to the fourth possible implementation manner of the third aspect, in a fifth possible implementation manner of the third aspect, on the shared frequency spectrum, transmit power of the second base station is higher than transmit power of the first base station.

Based on any one of the third aspect to the fifth possible implementation manner of the third aspect, in a sixth possible implementation manner of the third aspect, the performing, by the second base station at the time-frequency position, interference coordination on the first base station includes: reducing, by the second base station at the time-frequency position, data transmission power or using a noise reduction algorithm; or avoiding, by the second base station, performing resource scheduling at the time-frequency position.

According to a fourth aspect, an interference coordination method is provided, where the method is applied to a wireless communications system that includes a first base station, a second base station, and a multi-RAT controller. The first base station and the second base station use different radio access technologies. The first base station and the second base station share a time-frequency resource. The multi-RAT controller performs resource scheduling and management on the first base station and the second base station. The method includes: acquiring, by the multi-RAT controller, time-frequency position information corresponding to cell key information of the first base station, where the time-frequency position information is used for determining a time-frequency position that is corresponding to the cell key information of the first base station and that is on the shared time-frequency resource, and the cell key information includes at least one piece of the following information: a cell-specific reference signal CRS, a channel state indication-reference signal (CSI-RS), a physical broadcast channel (PBCH), and a synchronization signal. The method also includes sending, by the multi-RAT controller, the time-frequency position information to the second base station. The time-frequency position information corresponding to the cell key information of the first base station is used by the second base station to perform, at the time-frequency position, interference coordination on the first base station.

Based on the fourth aspect, in a first possible implementation manner of the fourth aspect, the acquiring, by the multi-RAT controller, time-frequency position information corresponding to cell key information of the first base station includes: receiving, by the multi-RAT controller, the time-frequency position information sent by the first base station. The time-frequency position information includes the following information: a time domain position corresponding to the cell key information of the first base station; or a frequency domain position corresponding to the cell key information of the first base station.

Based on the first possible implementation manner of the fourth aspect, in a second possible implementation manner of the fourth aspect, the time domain position information includes a time domain position corresponding to the cell key information of the first base station, or time information used for determining a time domain position. The time information includes absolute time corresponding to the cell key information of the first base station or frame information corresponding to the cell key information of the first base station, and the frame information includes a frame number, a subframe number, or an offset value of a constant subframe of a radio frame corresponding to the cell key information of the first base station.

Based on the first possible implementation manner or the second possible implementation manner of the fourth aspect, in a third possible implementation manner of the fourth aspect, the frequency domain position information includes: a frequency domain position corresponding to the cell key information of the first base station, or frequency domain information used for determining a frequency domain position. The frequency domain information includes a combination of an absolute frequency channel number corresponding to the cell key information, a center frequency of the first base station, and a preset frequency domain offset value, or a combination of a center frequency, bandwidth, and a physical resource block number.

Based on any one of the first possible implementation manner of the fourth aspect to the third possible implementation manner of the fourth aspect, in a fourth possible implementation manner of the fourth aspect, the time-frequency position information is the time domain position information, and the time-frequency position is all frequency domains or a preset frequency domain of the shared time-frequency resource, and the time domain position determined by the time domain position information; or the time-frequency position information is the frequency domain position information, and the time-frequency position is all time domains or a preset time domain of the shared time-frequency resource, and the frequency domain position determined by the frequency domain position information; or the time-frequency position information is the time domain position information and the frequency domain position information, and the time-frequency position is the time domain position determined by the time domain position information and the frequency domain position determined by the frequency domain position information.

Based on any one of the fourth aspect to the fourth possible implementation manner of the fourth aspect, in a fifth possible implementation manner of the fourth aspect, on the shared time-frequency resource, transmit power of the second base station is higher than transmit power of the first base station.

According to a fifth aspect, a communications system is provided, including a first base station and a second base station. The first base station and the second base station use different radio access technologies, the first base station and the second base station share a time-frequency resource, and the second base station is the base station according to any one of the first aspect to the sixth possible implementation manner of the first aspect.

According to a sixth aspect, a communications system is provided, including a first base station, a second base station, and a multi-RAT controller. The first base station and the second base station use different radio access technologies, the first base station and the second base station share a time-frequency resource, the multi-RAT controller performs resource scheduling and management on the first base station and the second base station, and the multi-RAT controller is the multi-RAT controller according to any one of the second aspect to the fifth possible implementation manner of the second aspect.

The embodiments provide an interference coordination method, an apparatus, and a system. The method includes: acquiring time-frequency position information corresponding to cell key information of the first base station, determining a time-frequency position that is corresponding to the cell key information of the first base station and that is on a shared time-frequency resource, and performing interference coordination on the first base station according to the time-frequency position. Therefore, it can be ensured that a problem of interference between networks is better resolved in a case of relatively low system overhead among inter-RAT networks that share a frequency spectrum.

BRIEF DESCRIPTION OF THE DRAWINGS

To describe the technical solutions in the embodiments of the present disclosure more clearly, the following briefly introduces the accompanying drawings required for describing the embodiments or the prior art. Apparently, the accompanying drawings in the following description show merely some embodiments of the present disclosure, and a person of ordinary skill in the art may still derive other drawings from these accompanying drawings without creative efforts.

DETAILED DESCRIPTION OF ILLUSTRATIVE EMBODIMENTS

The following describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

Figure 1:
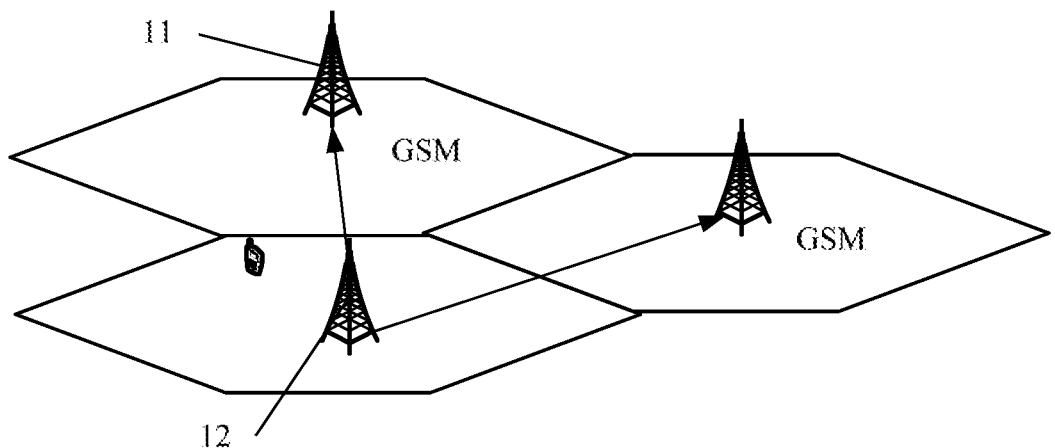
FIG. 1 is a schematic structural diagram of a communications system according to an embodiment.

An embodiment is applied to an inter-RAT radio access communications system. Referring to a communications system provided in FIG. 1, the system includes a first base station 12 and a second base station 11. Within the inter-RAT radio access network system, the first base station 12 and the second base station 11 use different radio access technologies. The first base station and the second base station share a time-frequency resource. The first base station and the second base station may use any existing manners of access technologies, for example, GSM, LTE, CDMA (Code Division Multiple Access,), and WCDMA (Wideband Code Division Multiple Access).

Figure 2:
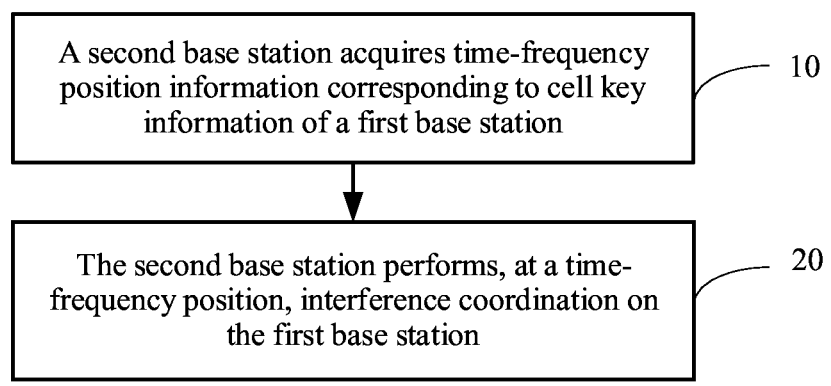
FIG. 2 is a schematic flowchart of an interference coordination method according to an embodiment.

For clear description, in the following embodiment, the first base station is an LTE base station, and the second base station is a GSM base station, which is not intended to limit the present disclosure. Referring to FIG. 2, an interference coordination method applied to the system shown in FIG. 1 may include the following steps.

10. The second base station acquires time-frequency position information corresponding to cell key information of the first base station, where the time-frequency position information is used for determining a time-frequency position that is corresponding to the cell key information of the first base station and that is on the shared time-frequency resource, and the cell key information includes at least one piece of the following information: a cell-specific reference signal (CRS), a channel state indication-reference signal (CSI-RS), a physical broadcast channel (PBCH), and a synchronization signal.

In step 10, the cell key information of the first base station is generally an important signal transmission parameter of the first base station. The cell key information includes at least one piece of the following information: a cell-specific reference signal (CRS), a channel state indication-reference signal (CSI-RS), a physical broadcast channel (PBCH), and a synchronization signal. In an LTE network, the CRS (cell-specific reference signal) is used for channel estimation and related demodulation of all downlink transmission technologies except a beamforming technology that is not based on a codebook; the CSI-RS is used for measuring channel information such as a CQI (channel quality indicator), a PMI (precoding matrix indicator), and an RI (rank indication), and may support measurement for a maximum of eight ports; the synchronization signal includes a PSS signal and an SSS signal and is used for downlink synchronization of a terminal, where the PSS (primary synchronization signal)

is used for time and frequency synchronization between user equipment and a base station on a primary synchronization channel, and the SSS (secondary synchronization signal) is used for time and frequency synchronization between user equipment and a base station on a secondary synchronization channel; the PBCH (physical broadcast channel) channel is used for carrying information such as broadcast data from a MAC layer. Demodulation of the foregoing information is of great importance for LTE network performance, and therefore it needs to be ensured that the foregoing information in the LTE network is not interfered by a GSM network.

Optionally, on the shared time-frequency resource, transmit power of the second base station (GSM base station) is higher than transmit power of the first base station (LTE base station). The second base station (GSM base station) may severely interfere with the first base station (LTE base station), and therefore the second base station (GSM base station) performs, at a time-frequency position, effective interference coordination on the first base station.

The time-frequency position information includes at least one of the following: time domain position information corresponding to the cell key information of the first base station and frequency domain position information corresponding to the cell key information of the first base station.

The time-frequency position information acquired by the second base station may be only the time domain position information, and in this case, the time-frequency position is all frequency domains or a preset frequency domain of the shared time-frequency resource, and a time domain position determined by the time domain position information. Alternatively, the time-frequency position information may be only the frequency domain position information, and in this case, the time-frequency position is all time domains or a preset time domain of the shared time-frequency resource, and a frequency domain position determined by the frequency domain position information. Alternatively, the time-frequency position information is the time domain position information and the frequency domain position information, and in this case, the time-frequency position is a time domain position determined by the time domain position information and a frequency domain position determined by the frequency domain position information.

The foregoing preset frequency domain or the foregoing preset time domain may be configured when the first base station and the second base station are deployed for network access, or may be configured by using a network management system before interference coordination is performed.

In the foregoing description, the time domain position information corresponding to the cell key information of the first base station includes a time domain position corresponding to the cell key information of the first base station, or time information used for determining a time domain position. The time information is absolute time or frame information, where the frame information may be a frame number, a subframe number, a timeslot number, an offset value of a constant subframe (for example, an offset value of subframe $0$), or the like of a radio frame. The time information used for determining the time domain position corresponding to the cell key information of the first base station may be a frame number, a subframe number, a timeslot number, or the like of a radio frame.

A frequency domain position corresponding to the cell key information of the first base station mainly includes frequency information, frequency domain range information, and the like, where the frequency information may be an absolute frequency channel number; frequency domain information used for determining the frequency domain position corresponding to the cell key information of the first base station may be a combination of an absolute frequency channel number corresponding to the cell key information, a center frequency of the first base station, and a preset frequency domain offset value, or a combination of a center frequency, bandwidth, and a physical resource block number.

Specifically, for example, frequency domain position information of a PBCH channel is a center frequency, a frequency domain range is from (center frequency−1.08 MHz (megahertz)/2) to (center frequency+1.08 MHz (megahertz)/2), and time domain position information of the PBCH channel is subframe $0$. A PSS signal and an SSS signal are used for downlink synchronization of a terminal. Frequency domain position information of the PSS signal is a center frequency, a frequency domain range is from (center frequency−1.08 MHz (megahertz)/2) to (center frequency+1.08 MHz (megahertz)/2), and time domain position information of the PSS signal is subframe $0$ and subframe $5$. Frequency domain position information of the SSS signal is a center frequency, a frequency domain range is from (center frequency−1.08 MHz (megahertz)/2) to (center frequency+1.08 MHz (megahertz)/2), and time domain position information of the SSS signal is subframe $0$ and subframe $5$. In the LTE network and the GSM network, frequency spacings are different, and timeslot durations are also different. For example, a granularity for scheduling and allocation in the LTE network is a physical resource block. Each physical resource block occupies 12 subcarriers in a frequency domain, each subcarrier is 15 KHz, and a frequency spacing is 180 KHZ. Each physical resource block occupies one subframe in a time domain, each subframe is 1 ms, each subframe includes two timeslots, and each timeslot is 0.5 ms. However, a frequency spacing in the GSM network is 200 KHz, each Time Division Multiple Access frame at each frequency includes eight timeslots, and each timeslot is 0.557 ms.

20. The second base station performs, at the time-frequency position, interference coordination on the first base station.

Specifically, after obtaining the time-frequency position information corresponding to the cell key information of the LTE network, the second base station obtains, according to a correspondence of a shared frequency spectrum that is of the GSM network and the LTE network and that is in a frequency domain and a time domain, the time-frequency position that is corresponding to the cell key information of the first base station and that is on the shared frequency spectrum, and performs interference coordination at the time-frequency position.

Specifically, for a PBCH time-frequency resource, a PBCH time-frequency resource in LTE is as follows: A frequency domain is 2101.0 MHz to 2102.08 MHz, and absolute time is 50012.001 s (second) to 50012.002 s (second). Corresponding frequencies in GSM are 2101.0 MHz to 2101.2 MHz, 2101.2 MHz to 2101.4 MHz, 2101.4 MHz to 2101.6 MHz, 2101.6 MHz to 2101.8 MHz, 2101.8 MHz to 2102.0 MHz, and 2102.0 MHz to 2102.2 MHz. Slot numbers corresponding to the absolute time of 50012.0001 s (second) to 50012.0002 s (second) on these carriers are slot $2$. To avoid co-channel interference, the second base station performs, at the time-frequency position, interference coordination on the first base station. Specifically, the first base station performs sending on a time-frequency resource of subframe $0$ (absolute time is 50012.001 s (second) to 50012.002 s (second)), of a center frequency of 2101.54

MHz, and of a bandwidth of 1.08 MHz. Then, corresponding frequencies in the time-frequency position information of the second base station are 2101.0 MHz to 2101.2 MHz, 2101.2 MHz to 2101.4 MHz, 2101.4 MHz to 2101.6 MHz, 2101.6 MHz to 2101.8 MHz, 2101.8 MHz to 2102.0 MHz, and 2102.0 MHz to 2102.2 MHz. Data transmission is avoided or data transmission power is reduced at the foregoing frequencies of the second base station; or a noise reduction algorithm is used at the foregoing frequencies, so as to avoid causing interference to the first base station when the first base station sends the PBCH.

Alternatively, a time domain resource and a frequency domain resource used by the first base station and the second base station for data transmission are configured for non-overlapping use. For example, a time domain resource of the second base station and a frequency domain resource corresponding to the cell key information of the first base station are configured for non-overlapping use. The first base station performs sending on a time-frequency resource of subframe 0 (absolute time is 50012.001 s (second) to 50012.002 s (second)), of a center frequency of 2101.54 MHz, and of a bandwidth of 1.08 MHz. Then, corresponding frequencies in the time-frequency position information of the second base station are 2101.0 MHz to 2101.2 MHz, 2101.2 MHz to 2101.4 MHz, 2101.4 MHz to 2101.6 MHz, 2101.6 MHz to 2101.8 MHz, 2101.8 MHz to 2102.0 MHz, and 2102.0 MHz to 2102.2 MHz. Slot numbers corresponding to the absolute time of 50012.001 s (second) to 50012.002 s (second) at the foregoing frequencies of the second base station are slot 2. Data is no longer transmitted at slot 2 (or resource scheduling is avoided at slot 2), so as to avoid causing interference to the first base station when the first base station sends the PBCH.

In this embodiment, a second base station acquires time-frequency position information corresponding to cell key information of the first base station, determines a time-frequency position that is corresponding to the cell key information of the first base station and that is on a shared time-frequency resource, and performs interference coordination on the first base station according to the time-frequency position. Unlike the prior art, interference coordination does not need to be performed on all time-frequency resources, and therefore a physical resource for interference coordination can be determined among inter-RAT networks that share a frequency spectrum, which ensures relatively low system overhead and achieves a purpose of performing interference coordination.

Determining, using the time-frequency position information corresponding to the cell key information of the first base station, to perform interference coordination at the time-frequency position that is corresponding to the cell key information of the first base station and that is on the shared time-frequency resource specifically includes the following schemes:

Scheme 1: The time-frequency position information corresponding to the cell key information of the first base station may be represented by the time domain position corresponding to the cell key information of the first base station and/or the frequency domain position corresponding to the cell key information of the first base station. That is, the second base station directly acquires the time domain position corresponding to the cell key information of the first base station and the frequency domain position corresponding to the cell key information of the first base station. When the second base station is transmitting data, it may be configured that the time-frequency position corresponding to the cell key information of the first base station is avoided, the time domain position corresponding to the cell key information of the first base station is avoided, or the frequency domain position corresponding to the cell key information of the first base station is avoided; or a center frequency corresponding to the cell key information of the first base station is avoided according to frequency domain information that can determine the foregoing frequency domain position. Further, in consideration that the cell key information of the first base station may occupy some bandwidth nearby the center frequency, for a frequency band with bandwidth evenly distributed, when the second base station is transmitting data, the center frequency corresponding to the cell key information of the first base station, and all frequencies within a range specified by a center frequency offset value or all frequencies within a bandwidth range to which the center frequency belongs may be avoided according to the frequency domain information of the frequency domain position, and a purpose of interference coordination is achieved in a case of relatively low system overhead.

Scheme 2: The time-frequency position information corresponding to the cell key information of the first base station may be represented by time information that can determine the time domain position corresponding to the cell key information of the first base station and frequency domain information that can determine the frequency domain position corresponding to the cell key information of the first base station, for example, frame information and center frequency information. That is, the second base station directly acquires the time information that can determine the time domain position corresponding to the cell key information of the first base station and the frequency domain information that can determine the frequency domain position corresponding to the cell key information of the first base station. For example, a position of a subframe at which information such as a CRS, a CSI-RS, a PBCH, a PSS, or an SSS is sent is fixed, and a frequency and bandwidth that are used for sending are fixed. The second base station uses the obtained frame information as time domain information of the foregoing information such as the CRS, the CSI-RS, the PBCH, the PSS, or the SSS, and obtains the time-frequency position information corresponding to the cell key information of the first base station with reference to the center frequency information of the first base station. When the second base station is transmitting data, it may be configured that the time-frequency position corresponding to the cell key information of the first base station is avoided, the time domain position corresponding to the cell key information of the first base station is avoided, or the frequency domain position corresponding to the cell key information of the first base station is avoided; or a center frequency corresponding to the cell key information of the first base station is avoided according to the frequency domain information that can determine the frequency domain position. Further, in consideration that the cell key information of the first base station may occupy some bandwidth nearby the center frequency, for a frequency band with bandwidth evenly distributed, when the second base station is transmitting data, the center frequency corresponding to the cell key information of the first base station, and all frequencies within a range specified by a center frequency offset value or all frequencies within a bandwidth range to which the center frequency belongs may be avoided according to the frequency domain information of the frequency domain position.

Scheme 3: The time-frequency position information corresponding to the cell key information of the first base station may be represented by the time domain position corresponding to the cell key information of the first base station and frequency domain information that can determine the frequency domain position corresponding to the cell key information of the first base station. When the second base station is transmitting data, it may be configured that the time-frequency position corresponding to the cell key information of the first base station is avoided, the time domain position corresponding to the cell key information of the first base station is avoided, or the frequency domain position corresponding to the cell key information of the first base station is avoided; or a center frequency corresponding to the cell key information of the first base station is avoided according to the frequency domain information that can determine the frequency domain position. Further, in consideration that the cell key information of the first base station may occupy some bandwidth nearby the center frequency, for a frequency band with bandwidth evenly distributed, when the second base station is transmitting data, the center frequency corresponding to the cell key information of the first base station, and all frequencies within a range specified by a center frequency offset value or all frequencies within a bandwidth range to which the center frequency belongs may be avoided according to the frequency domain information of the frequency domain position.

Scheme 4: The time-frequency position information corresponding to the cell key information of the first base station may be represented by time information that can determine the time domain position corresponding to the cell key information of the first base station and the frequency domain position corresponding to the cell key information of the first base station. When the second base station is transmitting data, it may be configured that the time-frequency position corresponding to the cell key information of the first base station is avoided, the time domain position corresponding to the cell key information of the first base station is avoided, or the frequency domain position corresponding to the cell key information of the first base station is avoided; or a center frequency corresponding to the cell key information of the first base station is avoided according to frequency domain information that can determine the frequency domain position. Further, in consideration that the cell key information of the first base station may occupy some bandwidth nearby the center frequency, for a frequency band with bandwidth evenly distributed, when the second base station is transmitting data, the center frequency corresponding to the cell key information of the first base station, and all frequencies within a range specified by a center frequency offset value or all frequencies within a bandwidth range to which the center frequency belongs may be avoided according to the frequency domain information of the frequency domain position.

Figure 3:
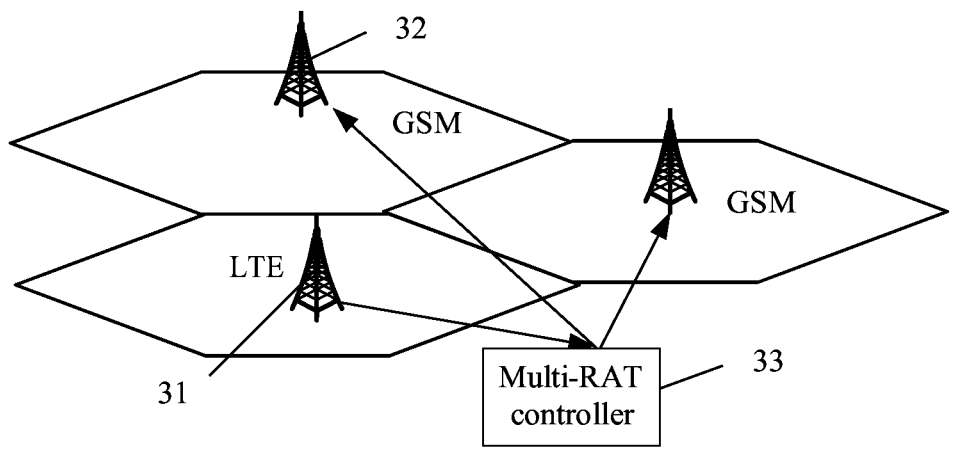
FIG. 3 is a schematic structural diagram of a communications system according to another embodiment.

An embodiment is applied to an inter-RAT radio access communications system. Referring to a communications system provided in FIG. 3, the system includes a first base station 31, a second base station 32, and a multi-RAT controller 33. Within the inter-RAT radio access network system, the first base station and the second base station use different radio access technologies. The first base station and the second base station share a time-frequency resource. The multi-RAT controller performs resource scheduling and management on the first base station and the second base station. The first base station and the second base station may use any existing manners of access technologies, for example, GSM, LTE, CDMA, and WCDMA.

Figure 4:
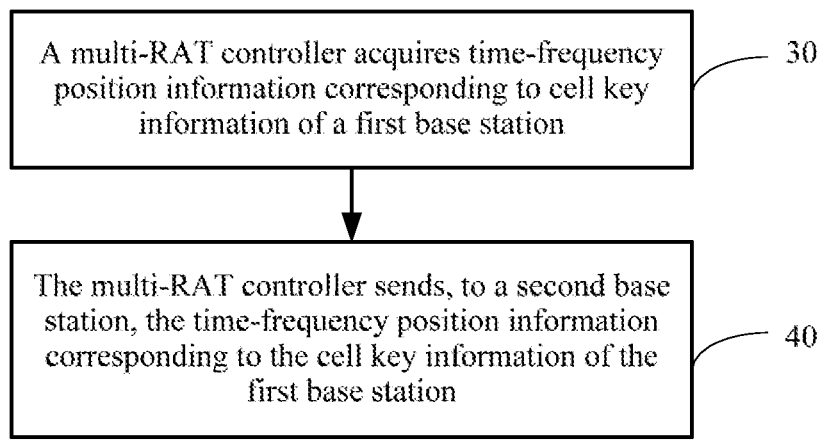
FIG. 4 is a schematic flowchart of an interference coordination method according to another embodiment.

For clear description, in the following embodiment, the first base station is an LTE base station, and the second base station is a GSM base station, which is not intended to limit the present disclosure. Referring to FIG. 4, an interference coordination method applied to the system shown in FIG. 3 may include the following steps.

30. The multi-RAT controller acquires time-frequency position information corresponding to cell key information of the first base station, where the time-frequency position information is used for determining a time-frequency position that is corresponding to the cell key information of the first base station and that is on the shared time-frequency resource, and the cell key information includes at least one piece of the following information: a cell-specific reference signal (CRS), a channel state indication-reference signal (CSI-RS), a physical broadcast channel (PBCH), and a synchronization signal.

In step 30, the cell key information of the first base station is generally an important signal transmission parameter of the first base station. The cell key information includes at least one piece of the following information: a cell-specific reference signal (CRS), a channel state indication-reference signal (CSI-RS), a physical broadcast channel (PBCH), and a synchronization signal. In an LTE network, the CRS is used for channel estimation and related demodulation of all downlink transmission technologies except a beamforming technology that is not based on a codebook; the CSI-RS is used for measuring channel information such as a CQI, a PMI, and an RI, and may support measurement for a maximum of eight ports; the synchronization signal includes a PSS signal and an SSS signal and is used for downlink synchronization of a terminal, where the PSS is used for time and frequency synchronization between user equipment and a base station on a primary synchronization channel, and the SSS is used for time and frequency synchronization between user equipment and a base station on a secondary synchronization channel; the PBCH channel is used for carrying information such as broadcast data from a MAC layer. Demodulation of the foregoing information is of great importance for LTE network performance, and therefore it needs to be ensured that the foregoing information in the LTE network is not interfered by a GSM network. Optionally, on a shared frequency spectrum, transmit power of the second base station (GSM base station) is higher than transmit power of the first base station (LTE base station), and therefore the second base station (GSM base station) performs, at the time-frequency position, interference coordination on the first base station.

The time-frequency position information includes at least one of the following: time domain position information corresponding to the cell key information of the first base station and frequency domain position information corresponding to the cell key information of the first base station.

The time-frequency position information acquired by the second base station may be only the time domain position information, and in this case, the time-frequency position is all frequency domains or a preset frequency domain of the shared time-frequency resource, and the time domain position determined by the time domain position information. Alternatively, the time-frequency position information may be only the frequency domain position information, and in this case, the time-frequency position is all time domains or a preset time domain of the shared time-frequency resource, and the frequency domain position determined by the frequency domain position information. Alternatively, the time-frequency position information is the time domain position information and the frequency domain position information, and in this case, the time-frequency position is the time domain position determined by the time domain position information and the frequency domain position determined by the frequency domain position information.

The foregoing preset frequency domain or the foregoing preset time domain may be configured when network access deployment is performed on the first base station and the second base station, or may be configured by using a network management system before interference coordination is performed.

In the foregoing description, the time domain position information includes a time domain position corresponding to the cell key information of the first base station, or time information used for determining a time domain position. The time information may be absolute time or frame information, where the frame information may be a frame number, a subframe number, a timeslot number, an offset value of a constant subframe (for example, subframe 0), or the like of a radio frame. The frequency domain position information corresponding to the cell key information of the first base station includes a frequency domain position corresponding to the cell key information of the first base station, or frequency domain information used for determining a frequency domain position. The frequency domain information mainly includes a combination of an absolute frequency channel number corresponding to the cell key information, a center frequency, and a preset frequency domain offset value, or a combination of a center frequency, bandwidth, and a physical resource block number.

Specifically, for example, frequency domain position information of a PBCH channel is a center frequency, a frequency domain range is from (center frequency−1.08 MHz (megahertz)/2) to (center frequency+1.08 MHz (megahertz)/2), and time domain position information of the PBCH channel is subframe 0. A PSS signal and an SSS signal are used for downlink synchronization of a terminal. Frequency domain position information of the PSS signal is a center frequency, a frequency domain range is from (center frequency−1.08 MHz (megahertz)/2) to (center frequency+ 1.08 MHz (megahertz)/2), and time domain position information of the PSS signal is subframe 0 and subframe 5. Frequency domain position information of the SSS signal is a center frequency, a frequency domain range is from (center frequency−1.08 MHz (megahertz)/2) to (center frequency+ 1.08 MHz (megahertz)/2), and time domain position information of the SSS signal is subframe 0 and subframe 5. In the LTE network and the GSM network, frequency spacings are different, and timeslot durations are also different. For example, a granularity for scheduling and allocation in the LTE network is a physical resource block. Each physical resource block occupies 12 subcarriers in a frequency domain, each subcarrier is 15 KHz, and a frequency spacing is 180 KHZ. Each physical resource block occupies one subframe in a time domain, each subframe is 1 ms, each subframe includes two timeslots, and each timeslot is 0.5 ms. However, a frequency spacing in the GSM network is 200 KHz, each Time Division Multiple Access frame at each frequency includes eight timeslots, and each timeslot is 0.557 ms.

40. The multi-RAT controller sends, to the second base station, the time-frequency position information corresponding to the cell key information of the first base station. The time-frequency position information corresponding to the cell key information of the first base station is used by the second base station to perform, at the time-frequency position, interference coordination on the first base station.

Specifically, after obtaining the time-frequency position information corresponding to the cell key information of the LTE network, the second base station obtains, according to a correspondence of a shared frequency spectrum that is of the GSM network and the LTE network and that is in a frequency domain and a time domain, the time-frequency position that is corresponding to the cell key information of the first base station and that is on the shared frequency spectrum, and performs interference coordination at the time-frequency position.

Specifically, for a PBCH time-frequency resource, a PBCH time-frequency resource in LTE is as follows: A frequency domain is 2101.0 MHz to 2102.08 MHz, and absolute time is 50012.001 s (second) to 50012.002 s (second). Corresponding frequencies in GSM are 2101.0 MHz to 2101.2 MHz, 2101.2 MHz to 2101.4 MHz, 2101.4 MHz to 2101.6 MHz, 2101.6 MHz to 2101.8 MHz, 2101.8 MHz to 2102.0 MHz, and 2102.0 MHz to 2102.2 MHz. Slot numbers corresponding to the absolute time of 50012.0001 s (second) to 50012.0002 s (second) on these carriers are slot 2. To avoid co-channel interference, the second base station performs, at the time-frequency position, interference coordination on the first base station. Specifically, the first base station performs sending on a time-frequency resource of subframe 0 (absolute time is 50012.001 s (second) to 50012.002 s (second)), of a center frequency of 2101.54 MHz, and of a bandwidth of 1.08 MHz. Then, corresponding frequencies in the time-frequency position information of the second base station are 2101.0 MHz to 2101.2 MHz, 2101.2 MHz to 2101.4 MHz, 2101.4 MHz to 2101.6 MHz, 2101.6 MHz to 2101.8 MHz, 2101.8 MHz to 2102.0 MHz, and 2102.0 MHz to 2102.2 MHz. Data is no longer transmitted, or data transmission power is reduced at the foregoing frequencies of the second base station; or a noise reduction algorithm (for various noise reduction algorithms, refer to the prior art) is used at the foregoing frequencies of the second base station, so as to avoid causing interference to the first base station when the first base station sends the PBCH.

Alternatively, a time domain resource and a frequency domain resource used by the first base station and the second base station for data transmission are configured for non-overlapping use. For example, a time domain resource of the second base station and a frequency domain resource corresponding to the cell key information of the first base station are configured for non-overlapping use. The first base station performs sending on a time-frequency resource of subframe 0 (absolute time is 50012.001 s (second) to 50012.002 s (second)), of a center frequency of 2101.54 MHz, and of a bandwidth of 1.08 MHz. Then, corresponding frequencies in the time-frequency position information of the second base station are 2101.0 MHz to 2101.2 MHz, 2101.2 MHz to 2101.4 MHz, 2101.4 MHz to 2101.6 MHz, 2101.6 MHz to 2101.8 MHz, 2101.8 MHz to 2102.0 MHz, and 2102.0 MHz to 2102.2 MHz. Slot numbers corresponding to the absolute time of 50012.001 s (second) to 50012.002 s (second) at the foregoing frequencies of the second base station are slot 2. Data is no longer transmitted at slot 2 (or resource scheduling is avoided at slot 2), so as to avoid causing interference to the first base station when the first base station sends the PBCH.

In this embodiment, a multi-RAT controller acquires time-frequency position information corresponding to cell key information of a first base station, and sends the time-frequency position information to a second base station, so that the second base station determines a time-frequency position that is corresponding to the cell key information of the first base station and that is on a shared time-frequency resource, and performs interference coordination on the first base station according to the time-frequency position. Therefore, a physical resource for interference coordination can be determined among inter-RAT networks that share a frequency spectrum, which reduces system overhead and achieves a purpose of interference coordination.

Specifically, determining, by using the time-frequency position information, the time-frequency position that is corresponding to the cell key information of the first base station and that is on the shared time-frequency resource includes the following schemes:

Scheme 5: The time-frequency position information that is corresponding to the cell key information of the first base station and that is sent by the multi-RAT controller may be represented by the time domain position information corresponding to the cell key information of the first base station and/or the frequency domain position information corresponding to the cell key information of the first base station. The second base station may directly acquire the time domain position corresponding to the cell key information of the first base station and the frequency domain position corresponding to the cell key information of the first base station. When the second base station is transmitting data, it may be configured that the time-frequency position corresponding to the cell key information of the first base station is avoided, the time domain position corresponding to the cell key information of the first base station is avoided, or the frequency domain position corresponding to the cell key information of the first base station is avoided; or a center frequency corresponding to the cell key information of the first base station is avoided according to the frequency domain information that can determine the frequency domain position. Further, in consideration that the cell key information of the first base station may occupy some bandwidth nearby the center frequency, for a frequency band with bandwidth evenly distributed, when the second base station is transmitting data, the center frequency corresponding to the cell key information of the first base station, and all frequencies within a range specified by a center frequency offset value or all frequencies within a bandwidth range to which the center frequency belongs may be avoided according to the frequency domain information of the frequency domain position.

Scheme 6: The time-frequency position information that is corresponding to the cell key information of the first base station and that is sent by the multi-RAT controller may be represented by time information that can determine the time domain position corresponding to the cell key information of the first base station and frequency domain information that can determine the frequency domain position corresponding to the cell key information of the first base station, for example, frame information and center frequency information. That is, the second base station directly acquires the time information that can determine the time domain position corresponding to the cell key information of the first base station and the frequency domain information that can determine the frequency domain position corresponding to the cell key information of the first base station. For example, a position of a subframe at which information such as a CRS, a CSI-RS, a PBCH, a PSS, or an SSS is sent is fixed, and a frequency and bandwidth that are used for sending are fixed. The second base station uses the obtained frame information as time domain information of the foregoing information such as the CRS, the CSI-RS, the PBCH, the PSS, or the SSS, and then obtains the time-frequency position information corresponding to the cell key information of the first base station with reference to the center frequency information of the first base station. When the second base station is transmitting data, it may be configured that the time-frequency position corresponding to the cell key information of the first base station is avoided, the time domain position corresponding to the cell key information of the first base station is avoided, or the frequency domain position corresponding to the cell key information of the first base station is avoided; or a center frequency corresponding to the cell key information of the first base station is avoided according to the frequency domain information that can determine the frequency domain position. Further, in consideration that the cell key information of the first base station may occupy some bandwidth nearby the center frequency, for a frequency band with bandwidth evenly distributed, when the second base station is transmitting data, the center frequency corresponding to the cell key information of the first base station, and all frequencies within a range specified by a center frequency offset value or all frequencies within a bandwidth range to which the center frequency belongs may be avoided according to the frequency domain information of the frequency domain position.

Scheme 7: The time-frequency position information that is corresponding to the cell key information of the first base station and that is sent by the multi-RAT controller may be represented by the time domain position corresponding to the cell key information of the first base station and frequency domain information that can determine the frequency domain position corresponding to the cell key information of the first base station. When the second base station is transmitting data, it may be configured that the time-frequency position corresponding to the cell key information of the first base station is avoided, the time domain position corresponding to the cell key information of the first base station is avoided, or the frequency domain position corresponding to the cell key information of the first base station is avoided; or a center frequency corresponding to the cell key information of the first base station is avoided according to the frequency domain information that can determine the frequency domain position. Further, in consideration that the cell key information of the first base station may occupy some bandwidth nearby the center frequency, for a frequency band with bandwidth evenly distributed, when the second base station is transmitting data, the center frequency corresponding to the cell key information of the first base station, and all frequencies within a range specified by a center frequency offset value or all frequencies within a bandwidth range to which the center frequency belongs may be avoided according to the frequency domain information of the frequency domain position.

Scheme 8: The time-frequency position information that is corresponding to the cell key information of the first base station and that is sent by the multi-RAT controller may be represented by time information that can determine the time domain position corresponding to the cell key information of the first base station and the frequency domain position corresponding to the cell key information of the first base station. When the second base station is transmitting data, it may be configured that the time-frequency position corresponding to the cell key information of the first base station is avoided, the time domain position corresponding to the cell key information of the first base station is avoided, or the frequency domain position corresponding to the cell key information of the first base station is avoided; or a center frequency corresponding to the cell key information of the first base station is avoided according to frequency domain information that can determine the frequency domain position. Further, in consideration that the cell key information of the first base station may occupy some bandwidth nearby the center frequency, for a frequency band with bandwidth evenly distributed, when the second base station is transmitting data, the center frequency corresponding to the cell key information of the first base station, and all frequencies within a range specified by a center frequency offset value or all frequencies within a bandwidth range to which the center frequency belongs may be avoided according to the frequency domain information of the frequency domain position.

Figure 5:
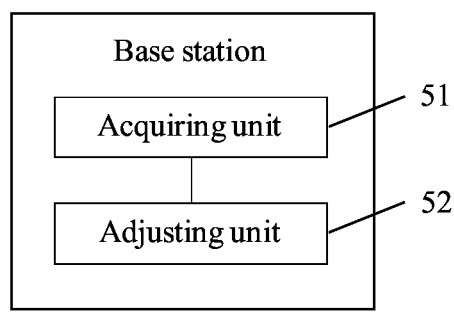
FIG. 5 is a schematic structural diagram of a base station according to an embodiment.

Referring to FIG. 5, an embodiment provides a base station that can implement the foregoing interference coordination method. For a concept or a process in the method, details may not be described again. The base station is used as a second base station, the base station is applied to a wireless communications system that includes a first base station and the second base station, the first base station and the second base station use different radio access technologies, and the first base station and the second base station share a time-frequency resource. When the base station is used as the second base station, the base station includes: an acquiring unit 51, configured to acquire time-frequency position information corresponding to cell key information of the first base station, where the time-frequency position information is used for determining a time-frequency position that is corresponding to the cell key information of the first base station and that is on the shared time-frequency resource, and the cell key information includes at least one piece of the following information: a cell-specific reference signal (CRS), a channel state indication-reference signal (CSI-RS), a physical broadcast channel (PBCH), and a synchronization signal. The base station also includes an adjusting unit 52, configured to perform, at the time-frequency position determined according to the time-frequency position information acquired by the acquiring unit 51, interference coordination on the first base station.

Optionally, the acquiring unit 51 is specifically configured to: receive the time-frequency position information sent by the first base station; or receive the time-frequency position information sent by a multi-RAT controller. The time-frequency position information includes the following information: time domain position information corresponding to the cell key information of the first base station; or frequency domain position information corresponding to the cell key information of the first base station.

Optionally, on the shared time-frequency resource, transmit power of the second base station is higher than transmit power of the first base station.

In this embodiment, a second base station acquires time-frequency position information corresponding to cell key information of the first base station, determines a time-frequency position that is corresponding to the cell key information of the first base station and that is on a shared time-frequency resource, and performs interference coordination on the first base station according to the time-frequency position. Therefore, a physical resource for inter-ference coordination can be determined among inter-RAT networks that share a frequency spectrum, and system overhead is reduced.

Figure 6:
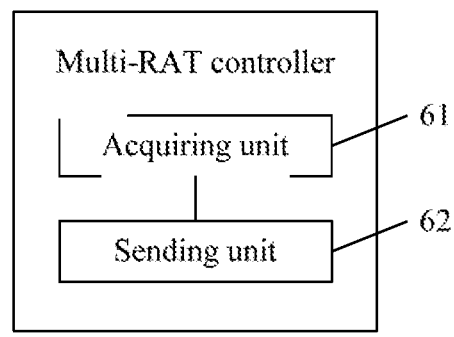
FIG. 6 is a schematic structural diagram of a multi-RAT controller according to an embodiment.

Referring to FIG. 6, an embodiment provides a multi-RAT controller, and the multi-RAT controller can implement the foregoing interference coordination method. For a concept or a process in the method, details may not be described again. The multi-RAT controller is applied to a wireless communications system that includes a first base station, a second base station, and the multi-RAT controller, the first base station and the second base station use different radio access technologies. The first base station and the second base station share a time-frequency resource. The multi-RAT controller performs resource scheduling and management on the first base station and the second base station. The multi-RAT controller includes: an acquiring unit 61, configured to acquire time-frequency position information corresponding to cell key information of the first base station, where the time-frequency position information is used for determining a time-frequency position that is corresponding to the cell key information of the first base station and that is on the shared time-frequency resource, and the cell key information includes at least one piece of the following information: a cell-specific reference signal (CRS), a channel state indication-reference signal (CSI-RS), a physical broadcast channel (PBCH), and a synchronization signal. The multi-RAT controller also includes a sending unit 62, configured to send, to the second base station, the time-frequency position information that is corresponding to the cell key information of the first base station and that is acquired by the acquiring unit 61. The time-frequency position information corresponding to the cell key information of the first base station is used by the second base station to perform, at the time-frequency position, interference coordination on the first base station.

Optionally, the acquiring unit 61 is specifically configured to: receive the time-frequency position information sent by the first base station. The time-frequency position information includes the following information: time domain position information corresponding to the cell key information of the first base station; or frequency domain position information corresponding to the cell key information of the first base station.

Optionally, on the shared time-frequency resource, transmit power of the second base station is higher than transmit power of the first base station.

In this embodiment, a multi-RAT controller acquires time-frequency position information corresponding to cell key information of a first base station, and sends the time-frequency position information to a second base station, so that the second base station determines a time-frequency position that is corresponding to the cell key information of the first base station and that is on a shared time-frequency resource, and performs interference coordination on the first base station according to the time-frequency position. Therefore, a physical resource for interference coordination can be determined among inter-RAT networks that share a frequency spectrum, and system overhead is reduced.

Figure 7:
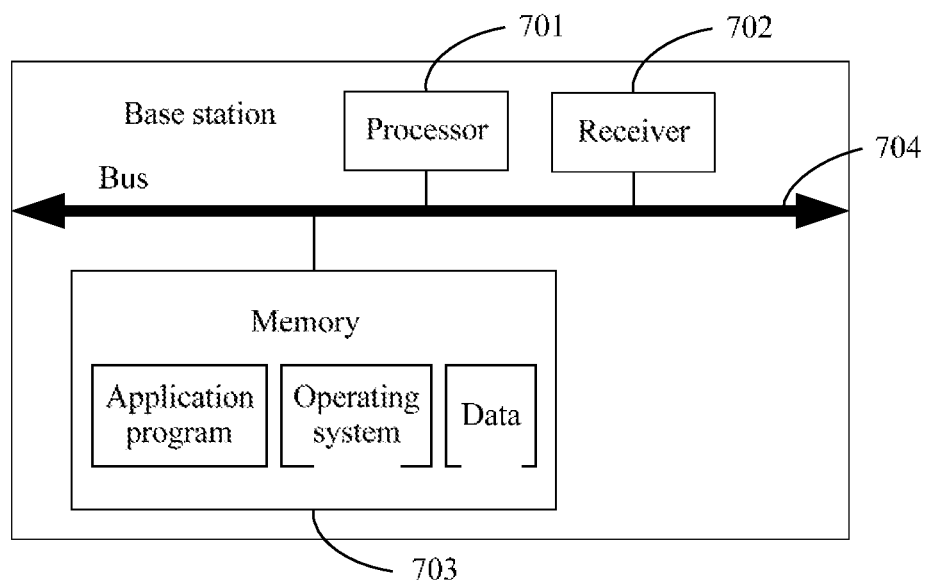
FIG. 7 is a schematic structural diagram of a base station according to another embodiment.

Referring to FIG. 7, an embodiment provides a base station that can implement the foregoing interference coordination method, the base station is applied to a wireless communications system that includes a first base station and a second base station, the first base station and the second base station use different radio access technologies, and the first base station and the second base station share a time-frequency resource. When the base station is used as the second base station, the base station includes: a processor 701, a receiver 702, a memory 703, and a bus 704, where the processor 701, the receiver 702, and the memory 703 communicate with each other by using the bus 704, and the memory 703 stores program code that is executed by the processor 701.

The bus 704 may be an Industry Standard Architecture (ISA for short) bus, a peripheral component interconnect (PCI for short) bus, an Extended Industry Standard Architecture (EISA for short) bus, or the like, which is not limited herein. The bus 704 may be categorized into an address bus, a data bus, a control bus, and the like. For ease of denotation, the bus is denoted by using only one bold line in FIG. 7; however, this does not indicate that there is only one bus or only one type of buses, where: the memory 703 is configured to store data or executable program code, where the program code includes a computer operation instruction, which may be specifically an operating system, an application program, or the like. The memory 703 may include a high-speed RAM memory, and may further include a non-volatile memory, such as at least one magnetic disk memory.

The processor 701 may be a central processing unit (CPU for short) or an application-specific integrated circuit (ASIC for short), or is configured as one or more integrated circuits that implement the embodiment of the present disclosure.

The processor 701 is configured to implement the interference coordination method in the foregoing embodiment by executing the program code in the memory 704.

The receiver 702 is configured to acquire time-frequency position information corresponding to cell key information of the first base station, where the time-frequency position information is used for determining a time-frequency position that is corresponding to the cell key information of the first base station and that is on the shared time-frequency resource, and the cell key information includes at least one piece of the following information: a cell-specific reference signal (CRS), a channel state indication-reference signal (CSI-RS), a physical broadcast channel (PBCH), and a synchronization signal.

The processor 701 is configured to perform, at the time-frequency position determined according to the time-frequency position information acquired by the receiver 72, interference coordination on the first base station.

Optionally, the receiver 702 is specifically configured to: receive the time-frequency position information sent by the first base station; or receive the time-frequency position information sent by a multi-RAT controller. The time-frequency position information includes the following information: time domain position information corresponding to the cell key information of the first base station; or frequency domain position information corresponding to the cell key information of the first base station.

Optionally, on the shared time-frequency resource, transmit power of the second base station is higher than transmit power of the first base station.

In this embodiment, a second base station acquires time-frequency position information corresponding to cell key information of the first base station, determines a time-frequency position that is corresponding to the cell key information of the first base station and that is on a shared time-frequency resource, and performs interference coordination on the first base station according to the time-frequency position. Therefore, a physical resource for interference coordination can be determined among inter-RAT networks that share a frequency spectrum, and system overhead is reduced.

Figure 8:
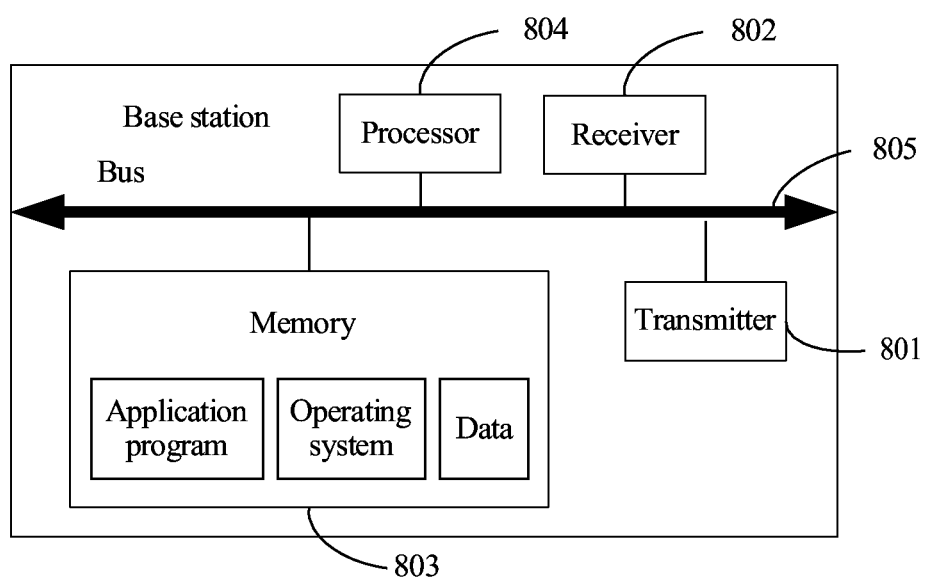
FIG. 8 is a schematic structural diagram of a multi-RAT controller according to another embodiment.

Referring to FIG. 8, an embodiment provides a multi-RAT controller, and the multi-RAT controller can implement the foregoing interference coordination method. The multi-RAT controller is applied to a wireless communications system that includes a first base station, a second base station, and the multi-RAT controller. The first base station and the second base station use different radio access technologies. The first base station and the second base station share a time-frequency resource, and the multi-RAT controller performs resource scheduling and management on the first base station and the second base station. The multi-RAT controller includes: a transmitter 801, a receiver 802, a memory 803, a processor 804, and a bus 805, where the transmitter 801, the receiver 802, the memory 803, and the processor 804 communicate with each other by using the bus 805.

The bus 805 may be an Industry Standard Architecture (ISA for short) bus, a peripheral component interconnect (PCI for short) bus, an Extended Industry Standard Architecture (EISA for short) bus, or the like, which is not limited herein. The bus 804 may be categorized into an address bus, a data bus, a control bus, and the like. For ease of denotation, the bus is denoted by using only one bold line in FIG. 8; however, this does not indicate that there is only one bus or only one type of buses, where: the memory 803 is configured to store data or executable program code, where the program code includes a computer operation instruction, which may be specifically an operating system, an application program, or the like. The memory 803 may include a high-speed RAM memory, and may further include a non-volatile memory (non-volatile memory), such as at least one magnetic disk memory.

The processor 804 may be a central processing unit (CPU for short) or an application-specific integrated circuit (ASIC for short), or is configured as one or more integrated circuits that implement the embodiment.

The processor 804 is configured to coordinate, by executing the program code in the memory 803, the transmitter 801 and the receiver 802 to implement the interference coordination method in the foregoing embodiment.

The receiver 802 is configured to acquire time-frequency position information corresponding to cell key information of the first base station, where the time-frequency position information is used for determining a time-frequency position that is corresponding to the cell key information of the first base station and that is on the shared time-frequency resource, and the cell key information includes at least one piece of the following information: a cell-specific reference signal (CRS), a channel state indication-reference signal (CSI-RS), a physical broadcast channel (PBCH), and a synchronization signal.

The transmitter 801 is configured to send, to the second base station, the time-frequency position information that is corresponding to the cell key information of the first base station and that is acquired by the receiver 802, where the time-frequency position information corresponding to the cell key information of the first base station is used by the second base station to perform, at the time-frequency position, interference coordination on the first base station.

Optionally, the receiver 802 is specifically configured to: receive the time-frequency position information sent by the first base station; where the time-frequency position information includes the following information: time domain position information corresponding to the cell key information of the first base station; or frequency domain position information corresponding to the cell key information of the first base station.

Optionally, on the shared frequency spectrum, transmit power of the second base station is higher than transmit power of the first base station.

In this embodiment, a multi-RAT controller acquires time-frequency position information corresponding to cell key information of a first base station, and sends the time-frequency position information to a second base station, so that the second base station determines a time-frequency position that is corresponding to the cell key information of the first base station and that is on a shared time-frequency resource, and performs interference coordination on the first base station according to the time-frequency position.

Therefore, a physical resource for interference coordination can be determined among inter-RAT networks that share a frequency spectrum, and system overhead is reduced.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method, comprising:
receiving, by a first base station from a second base station, resource position information corresponding to cell key information of the second base station, wherein the cell key information is a cell-specific reference signal (CRS) of the second base station, and the resource position information indicates a resource position of the CRS that is not to be interfered with, the resource position of the CRS is on a time-frequency resource that the first base station and the second base station share, the first base station operates according to a first radio access technology and the second base station operates according to a second radio access technology, and the first radio access technology is different from the second radio access technology, and wherein the resource position of the CRS is indicated using an indication of a time-frequency resource position that corresponds to the second radio access technology; and
performing, by the first base station using the received resource position information, coordination on the resource position of the CRS.

2. The method according to claim 1, wherein performing the coordination comprises:
reducing, by the first base station on the resource position of the CRS, a data transmission power or using a noise reduction algorithm.

3. The method according to claim 1, wherein the resource position of the CRS comprises an absolute time corresponding to the CRS.

4. The method according to claim 1, wherein the resource position of the CRS comprises: a combination of an absolute frequency channel number corresponding to the CRS, a center frequency of the first base station, and a preset frequency domain offset value.

5. The method according to claim 1, wherein performing the coordination comprises:
avoiding, by the first base station, resource scheduling on the resource position of the CRS.

6. The method according to claim 1, wherein the resource position of the CRS comprises frame information corresponding to the CRS, and the frame information comprises: a frame number, a subframe number, or an offset value of a subframe of a radio frame corresponding to the CRS.

7. The method according to claim 1, wherein the resource position of the CRS comprises: a combination of a center frequency, bandwidth, and a physical resource block number.

8. The method according to claim 1, wherein performing the coordination comprises:
mapping the resource position of the CRS to a time-frequency resource position corresponding to the first radio access technology; and
performing coordination on the time-frequency resource position corresponding to the first radio access technology.

9. A first base station, comprising:
a receiver; and
a processor coupled with the receiver;
wherein the receiver is configured to receive, from a second base station, resource position information corresponding to cell key information of the second base station, wherein the cell key information is a cell-specific reference signal (CRS) of the second base station, and the resource position information indicates a resource position of the CRS that is not to be interfered with, the resource position is on a time-frequency resource that the first base station and the second base station share, the first base station operates according to a first radio access technology and the second base station operates according to a second radio access technology, and the first radio access technology is different from the second radio access technology, and wherein the resource position of the CRS is indicated using an indication of a time-frequency resource position that corresponds to the second radio access technology; and
wherein the processor is configured to perform, using the received resource position information, coordination on the resource position of the CRS.

10. The first base station according to claim 9, wherein the processor being configured to perform coordination on the resource position of the CRS comprises the processor being configured to:
reduce, on the resource position of the CRS, a data transmission power, or use a noise reduction algorithm.

11. The first base station according to claim 9, wherein the resource position of the CRS comprises an absolute time corresponding to the CRS.

12. The first base station according to claim 9, wherein the resource position of the CRS comprises: a combination of an absolute frequency channel number corresponding to the cell key information, a center frequency of the first base station, and a preset frequency domain offset value.

13. The first base station according to claim 9, wherein the processor being configured to perform coordination on the resource position of the CRS comprises the processor being configured to:
avoid resource scheduling on the resource position of the CRS.

14. The first base station according to claim 9, wherein the resource position of the CRS comprises frame information corresponding to the CRS, and the frame information comprises: a frame number, a subframe number, or an offset value of a subframe of a radio frame corresponding to the CRS.

15. The first base station according to claim 9, wherein the resource position of the CRS comprises a combination of a center frequency, bandwidth, and a physical resource block number.

16. The first base station according to claim 9, wherein the processor being configured to perform coordination on the resource position of the CRS comprises the processor being configured to:
map the resource position of the CRS to a time-frequency resource position corresponding to the first radio access technology; and
perform coordination on the time-frequency resource position corresponding to the first radio access technology.

17. A non-transitory computer readable medium storing instructions, wherein when the instructions are executed by a processor, the instructions cause a first base station to:
receive, from a second base station, resource position information corresponding to cell key information of the second base station, wherein the cell key information is a cell-specific reference signal (CRS) of the second base station, and the resource position information indicates a resource position of the CRS that is not to be interfered with, the resource position is on a time-frequency resource that the first base station and the second base station share, the first base station operates according to a first radio access technology and the second base station operates according to a second radio access technology, and the first radio access technology is different from the second radio access technology, and wherein the resource position of the CRS is indicated using an indication of a time-frequency resource position that corresponds to the second radio access technology; and
performing, using the received resource position information, coordination on the resource position of the CRS.

18. The medium according to claim 17, wherein performing the coordination comprises:
reducing, by the first base station on the resource position of the CRS, a data transmission power, or using a noise reduction algorithm; or
avoiding, by the first base station, resource scheduling on the resource position of the CRS.

19. The medium according to claim 17, wherein the resource position of the CRS comprises an absolute time corresponding to the CRS or frame information corresponding to the CRS, and the frame information comprises: a frame number, a subframe number, or an offset value of a subframe of a radio frame corresponding to the CRS.

20. The medium according to claim 17, wherein the resource position of the CRS comprises: a combination of an absolute frequency channel number corresponding to the CRS, a center frequency of the first base station, and a preset frequency domain offset value, or a combination of a center frequency, bandwidth, and a physical resource block number.

* * * * *